United States Patent [19]

Gauron

[11] Patent Number: 4,768,907
[45] Date of Patent: Sep. 6, 1988

[54] GANG NUT ASSEMBLY

[76] Inventor: Richard F. Gauron, 26020 S.E. 158th, Issaquah, Wash. 98027

[21] Appl. No.: 885,457

[22] Filed: Jul. 14, 1986

[51] Int. Cl.[4] .............................................. F16B 27/00
[52] U.S. Cl. ..................................... 411/85; 411/182; 411/112; 411/427; 411/966
[58] Field of Search ................... 411/84, 85, 103, 104, 411/105, 106, 107, 108, 111, 112, 113, 182, 349, 901, 427, 432, 966, 999

[56] References Cited

U.S. PATENT DOCUMENTS

| 2,333,386 | 11/1943 | Murphy | 411/84 |
|---|---|---|---|
| 2,421,201 | 5/1947 | Hallock | 411/84 |
| 2,421,278 | 5/1947 | Luck | 411/84 |
| 3,126,039 | 3/1964 | Kiddler | 411/112 |
| 4,315,393 | 2/1982 | Schack et al. | 411/427 |
| 4,385,234 | 11/1982 | Takegawa | 411/182 |
| 4,488,844 | 12/1984 | Baubles | 411/85 |
| 4,579,492 | 4/1986 | Kazino et al. | 411/182 |
| 4,606,688 | 8/1986 | Moran et al. | 411/427 X |
| 4,645,393 | 2/1987 | Pletcher | 411/84 |
| 4,666,355 | 5/1987 | Stover | 411/85 |
| 4,695,212 | 9/1987 | Berecz | 411/85 |

FOREIGN PATENT DOCUMENTS

| 952044 | 11/1956 | Fed. Rep. of Germany | 411/106 |
|---|---|---|---|
| 2010321 | 9/1971 | Fed. Rep. of Germany | 411/112 |
| 1269690 | 7/1961 | France | 411/108 |
| 482929 | 1/1970 | Switzerland | 411/112 |
| 1217382 | 12/1970 | United Kingdom | 411/112 |

Primary Examiner—Gary L. Smith
Assistant Examiner—Suzanne L. Dino
Attorney, Agent, or Firm—Delbert J. Barnard

[57] ABSTRACT

A plurality of nut inserts (40) and an elongated channel (10) form a gang nut assembly. The channel (10) is formed to include a plurality of longitudinally spaced apart nut receiving openings (28). These openings (28) are partially defined by opposed recesses (24, 26) in flanges (18, 20). The nut insert (40) has a base length (LB) which is smaller than the length (Y) of the opening (28). It also has end walls (44, 46) which diverge apart as they extend upwardly from a base (42). The base (42) is put into registry with the opening (28) and the nut insert (40), is pushed upon, to force it through the opening (28). The sloping outer surfaces of the end walls (44, 46) contact flange edges (30, 32, 34, 36). This causes the end walls (44, 46) to spring together, in response to the push on the nut insert (40), allowing the nut insert (40) to pass through the opening (28). The end walls (44, 46) are of such a height that their tops (48, 50) are inwardly of the inner surfaces of the flanges (18, 20) at about the time the base (42) of the nut insert (40) contacts the channel base wall (12). As a result, the end walls (44, 46) spring apart and occupy positions below the flanges (18, 20) and serve to lock the nut insert (40) in place. The nut insert (40) is free to float both lengthwise and laterally of the channel (10), for alignment purposes.

16 Claims, 2 Drawing Sheets

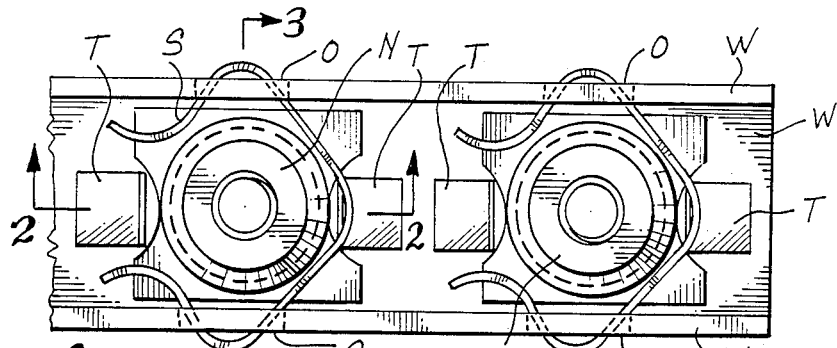

GANG NUT ASSEMBLY

TECHNICAL FIELD

This invention relates to a type of fastener which is characterized by a plurality of fastener nuts spaced apart along a support channel. More particularly, it relates to the provision of a gang nut assembly which includes nut inserts which make a snap fit connection to the channel.

BACKGROUND ART

Conventional gang nut assemblies comprise an elongated channel member and a plurality of nut units which are spaced apart along the web of the channel. The nut units present internally threaded openings having centers which are parallel to each other and which extend perpendicular to the web of the channel. The nut units N have a base B (FIGS. 1-3) which sets down on the channel web W. A pair of struck out tabs T limit longitudinal movement of the nut units. The channel sidewalls W limit sideways movement. A spring S, having side portions which fit into sidewall openings O, retain the nut units N. This construction allows the nut units N to float somewhat both laterally and longitudinally of the channel. The purpose of the float is to accommodate some misalignment of the nut opening and the bolt or stud to which it is to be attached. The need for a spring S, the web tabs T, and the sidewall opening, results in this type of gang nut assembly being relatively expensive to manufacture.

A principal object of the present invention is to provide a new gang nut assembly construction characterized by the channel, a plurality of one piece nut units, and a snap fit connection of the nut units to the channel.

DISCLOSURE OF THE INVENTION

The gang nut assembly of the present invention comprises an elongated channel having a substantially C-shaped cross section formed by a base wall, a pair of sidewalls extending substantially perpendicular from the base wall, and a pair of endwardly directed flanges extending substantially perpendicular from the sidewalls. The channel includes a plurality of nut stations spaced along its length. Each nut station is characterized by a pair of opposed recesses in the flanges forming a substantially rectangular nut insert receiving opening.

In basic construction, the nut insert comprises a substantially rectangular base, a pair of end walls connected to the base and diverging apart as they extend upwardly from the base, and an internally threaded tubular end portion connected to the base and extending perpendicular from the base on the same side of the base as the end walls. The nut insert has a width that is smaller than the width of a nut insert receiving opening. It has a length at its base which is smaller than the length of the nut insert receiving opening. It has a length at the tops of the end walls which is larger than the length of the nut insert receiving opening. The end walls are bendable towards each other. This enables the nut insert to be positioned with its base within a nut insert receiving opening and then be pushed upon to force it through the nut insert receiving opening. This pushing action causes the end walls to bend towards each other as the nut insert moves through the nut insert receiving opening to the channel. The end walls are of such a height that when the nut insert is within the channel, and its base is against the base wall channel, the end walls will spring apart to position the tops of the end walls below the flanges. In this manner the nut insert is connected to the channel.

In preferred form, the channel includes a base opening in its base wall which is aligned with the nut insert receiving openings. The nut insert includes a portion which extends downwardly below the base of the nut insert into the base opening. This portion of the nut insert is narrower than the base opening, allowing the nut insert to float in position relative to the channel, so that the nut insert can move in position for the purpose of accommodating some misalignment of its threaded opening with a bolt or stud to which the nut insert is to be connected.

In accordance with an aspect of the invention, the nut inserts and the channel are constructed from a strong, lightweight structural plastic material.

Other more detailed features of the invention are hereinafter described as a part of the description of the preferred embodiment of the invention which is also the best mode of the invention.

BRIEF DESCRIPTION OF THE DRAWING

Like reference numerals are used to designate like parts throughout the several views of the drawing, and:

FIG. 1 is a top plan view of a fragmentary portion of a conventional gang nut assembly;

FIG. 2 is a sectional view taken substantially along 2—2 of FIG. 1;

FIG. 3 is a sectional view taken substantially along line 3—3 of FIG. 1;

FIG. 4 is a top plan view of a gang nut assembly embodying the present invention;

FIG. 5 is a sectional view taken substantially along line 5—5 of FIG. 4;

FIG. 6 is a sectional view taken substantially along line 6—6 of FIG. 4;

FIG. 7 is a sectional view taken substantially along line 7—7 of FIG. 4;

BEST MODE FOR CARRYING OUT THE INVENTION

Figure 8:
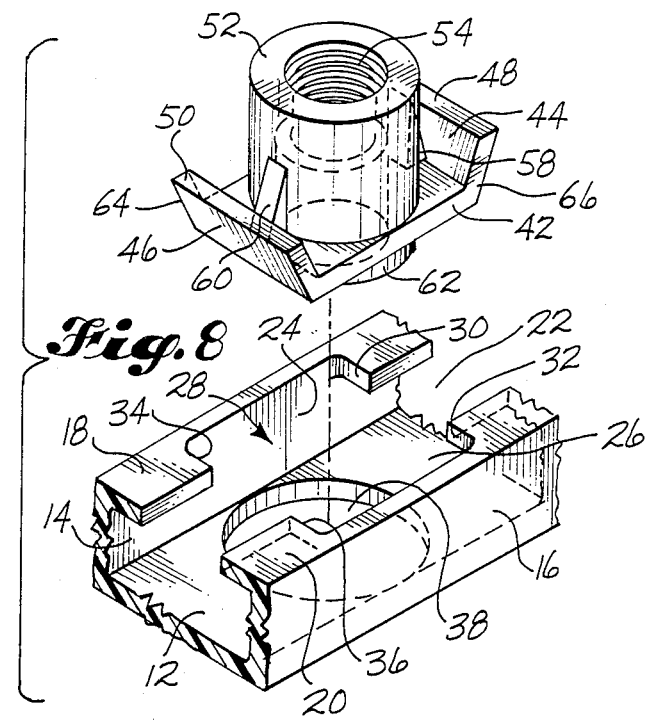
FIG. 8 is a pictorial view showing the nut insert spaced out from a fragmentary portion of the channel.
Figure 9:
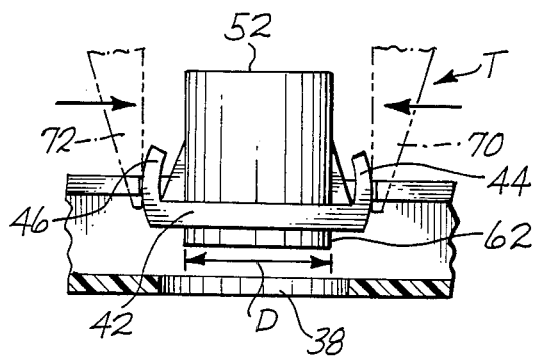
FIG. 9 is a view showing the jaws of a removal tool moved inwardly against the end walls by an amount sufficient to bend the end walls into a position in which they are parallel to each other and the top width of the nut insert equals the bottom width of the nut insert.

Referring to FIGS. 4-9, the channel 10 has a generally C-shaped cross section (FIG. 5) formed by a base wall 12, a pair of sidewalls 14, 16 which extend perpendicular to the base wall 12, and a pair of flanges 18, 20 which extend perpendicular to the sidewalls 14, 16. The flanges 18, 20 are substantially coplanar and they define between them an open space 22.

Channel 10 has an indeterminate length and a plurality of nut stations spaced apart along its length. At each nut station the flanges 18, 20 are formed to include recesses 24, 26. The recesses 24, 26 are identical in size and shape and each recess 24, 26 is positioned opposite the other recess 24, 26. In the illustrated embodiment the recesses 24, 26 extend all the way to the inner surfaces of the sidewalls 14, 16. The recesses 24, 26 define a nut insert receiving opening 28 having a width X and a length Y. In the illustrated embodiment, the inner surfaces of the sidewalls 14, 16 define the sides of the opening 28. Flange edge surfaces 30, 32, 34, 36 at the ends of the recesses 24, 26 define the ends of the openings 28.

In preferred form, a base opening 38 is formed in the base wall 12. This opening 38 may be circular in shape and may have a diameter substantially equal to the width dimension X. The opening 38 is aligned with the opening 28. Preferably, the centers of these openings 38, 28 coincide.

The nut inserts 40 are identical in construction. Each has a substantially rectangular base 42, and a pair of end walls 44, 46, extending upwardly from the ends of the base 42. The end walls 44, 46 diverge apart as they extend upwardly from the base 42. In the illustrated embodiment the angle between each end wall 44, 46 and the base 42 is about one hundred and ten degrees. Each end wall 44, 46 includes a top 48, 50. The tops 48, 50 are in a common plane which is parallel to the base 42.

The nut insert 40 includes an internally threaded stem 52 which projects away from the base 42 in the same direction as the end walls 44, 46. The stem 52 includes a threaded central opening 54 which has a center axis that extends perpendicular to the base 42. Preferably, a pair of strengthening ribs 58, 60 extend between the base 42 and outer side portions of the stem 52. These ribs 58, 60 may be triangular in shape, with one side of the triangle being joined to the base 42 and the other side of the triangle being joined to the stem 52. Preferably, the ribs 58, 60 are coplanar and they are centered widthwise of the nut insert 40 (FIG. 4).

Preferably, the nut insert 40 includes a stem extension 62, which projects away from the base 42 on the opposite side of the base from the stem 52. Extension 62 has a diameter D which is smaller than the diameter of the base opening 38.

The nut insert 40 has a base length LB which is shorter than the length Y of the nut insert receiving opening 28. It also includes a top length LT (a length at the tops 48, 50 of the sidewalls 44, 46) which is longer than the length Y of the nut insert receiving opening 28. The nut insert 40 has side boundaries 64, 60 which are parallel to each other, and in the preferred embodiment extend at a tangent to the outside surface of the stem 52 (FIG. 4). The distance between the side boundaries 64, 66, i.e. the width of the nut insert 40, is also narrower than the nut insert receiving opening 28. This means that it is narrower than the width dimension of the inside of the channel 10. In the illustrated embodiment, the extension 62 has a length substantially equal to the thickness dimension of the channel base wall 12.

Each nut insert 40 is easily and quickly attached to the channel 10 in the following manner. The base of the nut insert 40 is brought into alignment with some of the nut insert receiving openings 28. The side boundaries 64, 66 are oriented so that they are parallel to the channel sidewalls 14, 16. The base 42 enters the opening 28 until the flange edges 30, 32 and 34, 36 at the ends of the opening 28 contact the outer surfaces of the sidewalls 44, 46, respectively. Then, the nut insert 40 is pushed towards the channel 10. The contact made between the flange edge surfaces 30, 32 and 34, 36 and the sloping outer surfaces of the end walls 44, 46, causes the end walls 44, 46 to bend inwardly in response to the push. These walls 44, 46 continue to bend as inward movement of the nut insert 40 continues until the top length has been shortened to the extent that it is equal to the LT length dimension Y of the nut insert receiving opening 28. When this happens the nut insert 40 snaps into the channel and the bottom surface of the base 42 contacts the inner surface of the channel base wall 12. The static height dimension H of the end walls 44, 46 is such that the top 48, 50 of the end walls 44, 46 are located inside of the channel 10 when the base 42 makes contact with the channel base wall 12. As a result, the end walls 44, 46 spring back into their static positions (FIG. 7) just as soon as their tops 48, 50 clear the flanges 18, 20. As shown by FIG. 7, this places the tops 48, 50 below the portions of the channel flanges 18, 20 which endwise bound the nut insert receiving opening 28.

In the illustrated embodiment, the static height H is substantially equal to the inside height of the channel 10, measured from the inside surface of the channel base wall 12 to the plane of the inside surfaces of the flanges 18, 20. This location of the end walls 44, 46 below the flanges 18, 20 secures the nut insert 40 against inadvertent movement out from the channel 10 through the opening 28. As long as the end walls 44, 46 are positioned below the flanges 18, 20, the nut insert 40 is effectively connected to the channel 10.

As stated above, the extension 62 has an outside diameter which is smaller than the diameter of the base opening 38. As a result, an annular space 68 (FIG. 7) is defined by and between the outer peripheral surface of extension 62 and the edge boundary of the base opening 38. The presence of this annular space or gap 68 allows the nut insert 40 to "float" both lengthwise and widthwise of the channel 10. This "floating" ability makes it easier to align the threaded opening 54 with the bolt or stud with which it makes a threaded engagement. The diameter of the extension 68 is equal to the width dimension of the nut insert 40. The diameter of base opening 38 is equal to the width dimension X of the inside of the channel 10. As a result of these dimensional relationships, a full float is permitted laterally of the channel 10. That is, a side boundary 64 or 66 of the nut insert 40 will not contact a channel sidewall 14, 16 before the extension 68 has had a chance to float across the gap 68 and contact the edge surface of base opening 38.

Preferably, the channel 10 and the nut inserts 40 are all constructed from a high strength structural plastic material. There are high strength plastic materials available today which are stronger than the metals which are normally used for this type of product. An example material of this type is manufactured by AMOCO under the tradename TORLON TM, Specification No. 9040. The nut inserts 40 can be injection molded from this material, or a similar material, and then tapped to provide the internal threads in the opening 54. The plastic provides the necessary strength and toughness and at the same time is lighter in weight than the metals that are normally used.

The nut inserts 40 can be easily and quickly removed from the channel if desired. Removal may be achieved by a plyers type tool T having jaws 70, 72 which are narrow enough to fit within the space between the flanges 18, 20 end wise outwardly of a nut insert receiving opening 28 (FIG. 16). The jaws 70, 72 are the lower end portions of a pair of levers which are hinge connected together and which have handles at their ends opposite the jaws.

As shown by FIG. 13, the jaws 70, 72 are inserted into the between-the-flange spaces 22, with the jaws 70, 72 open. Then, the handles are brought together to at the same time bring the jaws 70, 72 together, into contact with the outer surfaces of the end walls 44, 46.

The handles are squeezed until the outer surfaces of the end walls 44, 46 are substantially perpendicular to the plane of the base 42. At this time the length LT substantially equals length LB and the plyers can be moved away from the channel 10 to withdraw the nut insert 40 out through the nut insert receiving opening 28.

What is claimed is:

1. A gang nut assembly, comprising:

an elongated channel having a substantially C-shaped cross section formed by a base wall, a pair of sidewalls extending substantially perpendicular from the base wall, and a pair of inwardly directed flanges extending substantially perpendicular from the sidewalls and defining between them a slot, said channel having a plurality of nut stations spaced along its length, each nut station being characterized by a pair of opposed recesses in the flanges forming a substantially rectangular nut insert receiving opening that is substantially wider than the slot:

a nut insert comprising a substantially rectangular base, a pair of end walls connected to the base and diverging apart as they extend upwardly from the base, each said end wall having a top, and an internally threaded tubular stem portion connected to the base and extending perpendicular from the base on the same side of the base as the end walls, said nut insert having a width that is smaller than the width of a nut insert receiving opening, a length at its base which is smaller than the length of the nut insert receiving opening, and a length at the tops of the end walls which is larger than the length of the nut insert receiving opening, said end walls being bendable towards each other so that the nut insert can be positioned with its base within a nut insert receiving opening and then be pushed upon to force it through the nut insert receiving opening, causing the end walls to bend towards each other as the nut insert moves through the nut insert receiving opening into the channel, and said end walls being of such a height that when the nut insert is within the channel, and the base of the nut insert is against the base wall of the channel, the end walls will spring apart to position the tops of the end walls below the flanges, to in that manner lock the nut insert in the channel.

2. A gang nut assembly according to claim 1, wherein said channel includes a base opening in its base wall which is aligned with the nut insert receiving opening, and the nut insert includes a portion which extends downwardly below the base of the nut insert into said base opening, and wherein said portion is narrower than the base opening, so that the nut insert is able to float in position lengthwise of the channel, for purposes of alignment, until such portion contacts an edge portion of the base opening.

3. A gang nut assembly according to claim 1, wherein the base of the nut insert is narrower than the distance between the sidewalls of the channel, so that the nut insert can float in a position laterally of the channel, for purposes of alignment.

4. A gang nut assembly according to claim 3, wherein said channel includes a base opening in its base wall which is aligned with the nut insert receiving opening, and the nut insert includes a portion which extends downwardly below the base of the nut insert into said base opening, and said portion is narrower than the base opening, so that the insert is able to float in position both laterally and lengthwise of the channel, for purposes of alignment, until such portion makes contact with an edge portion of the base opening.

5. A gang nut assembly according to claim 1, wherein the stem of the nut insert projects upwardly from the base of the nut insert, and said nut insert includes strengthening ribs which extend between the base of the nut insert and side portions of said stem.

6. A gang nut assembly according to claim 2, wherein the stem of the nut insert projects upwardly from the base of the nut insert, and said nut insert includes strengthening ribs which extend between the base of the nut insert and side portions of said stem.

7. A gang nut assembly according to claim 3, wherein the stem of the nut insert projects upwardly from the base of the nut insert, and said nut insert includes strengthening ribs which extend between the base of the nut insert and side portions of said stem.

8. A gang nut assembly according to claim 4, wherein the stem of the nut insert projects upwardly from the base of the nut insert, and said nut insert includes strengthening ribs which extend between the base of the nut insert and side portions of said stem.

9. A gang nut assembly according to claim 1, wherein the nut insert is constructed from a structural plastic material.

10. A gang nut assembly according to claim 1, wherein the channel is constructed from a structural plastic.

11. A gang nut assembly according to claim 1, wherein the nut insert and the channel are both constructed from a structural plastic material.

12. A gang nut assembly according to claim 1, further including a tool having jaw portions which are positionable between the flanges of the channel, outwardly adjacent the two end walls of the nut insert, and means for moving said jaws together and against the end walls, for moving the end walls towards each other until the length of the nut insert at the tops of the end walls is smaller than the length of the nut insert receiving opening.

13. A gang nut assembly according to claim 12, wherein said channel includes a base opening in its base wall which is aligned with the nut insert receiving opening, and the nut insert includes a portion which extends downwardly below the base of the nut insert into said base opening, and said portion is narrower than the base opening, so that the nut insert is able to float in position lengthwise of the channel, for purposes of alignment, until said portion contacts an edge portion of said base opening.

14. A gang nut assembly according to claim 12, wherein the base of the nut insert is narrower than the distance between the sidewalls of the channel, so that the nut insert can float in position laterally of the channel, for purposes of alignment.

15. A gang nut assembly according to claim 14, wherein said channel includes a base opening in its base wall which is aligned with the nut insert receiving opening, and the nut insert includes a portion which extends downwardly below the base of the nut insert into said base opening, and said portion is narrower than the base opening, so that the insert is able to float in position both laterally and lengthwise of the channel, for purposes of alignment, until said portion contacts an edge portion of said base opening.

16. A gang nut assembly according to claim 12, wherein the stem of the nut insert projects upwardly from the base of the nut insert, and said nut insert includes strengthening ribs which extend between the base of the nut insert and side portions of said stem.

* * * * *